US012750883B2

(12) United States Patent
Shetty et al.

(10) Patent No.: US 12,750,883 B2
(45) Date of Patent: Sep. 29, 2026

(54) NETWORK SUPPORTING TDMA AND CSMA BASED DEVICES

(71) Applicant: Honeywell International Inc., Charlotte, NC (US)

(72) Inventors: Udaya Shetty, Herndon, VA (US); Prasad Samudrala, Suwanee, GA (US); Mithun Mathew, Kasavanahalli (IN); Yuvaraj Nagendran, Bangalore (IN)

(73) Assignee: HONEYWELL INTERNATIONAL INC., Maple Grove, MN (US)

( * ) Notice: Subject to any disclaimer, the term of this patent is extended or adjusted under 35 U.S.C. 154(b) by 649 days.

(21) Appl. No.: 18/309,689

(22) Filed: Apr. 28, 2023

(65) Prior Publication Data

US 2024/0365378 A1 Oct. 31, 2024

(51) Int. Cl.
*H04W 74/0808* (2024.01)

(52) U.S. Cl.
CPC ................................ *H04W 74/0808* (2013.01)

(58) Field of Classification Search
CPC ..... H04W 74/02; H04W 74/04; H04W 74/08; H04W 74/0808; H04W 84/18; H04W 72/0446
See application file for complete search history.

(56) References Cited

U.S. PATENT DOCUMENTS

| | | | | |
|---|---|---|---|---|
| 7,885,240 B2 | | 2/2011 | Joshi et al. | |
| 8,320,321 B2 | | 11/2012 | Joshi et al. | |
| 2008/0089311 A1 | * | 4/2008 | Roy | H04L 67/12 370/345 |
| 2008/0316966 A1 | * | 12/2008 | Joshi | H04W 74/02 370/330 |
| 2009/0010205 A1 | * | 1/2009 | Pratt, Jr. | H04W 56/002 370/328 |
| 2018/0310175 A1 | * | 10/2018 | Kim | H04W 4/70 |
| 2021/0321453 A1 | * | 10/2021 | Reisbick | H04L 5/0064 |
| 2022/0369383 A1 | * | 11/2022 | Yang | H04W 74/002 |

FOREIGN PATENT DOCUMENTS

| | | |
|---|---|---|
| CN | 109862618 A | 6/2019 |
| KR | 1806655 B1 | 12/2017 |

* cited by examiner

*Primary Examiner* — Ricky Q Ngo
*Assistant Examiner* — Kabir U Jahangir
(74) *Attorney, Agent, or Firm* — Seager, Tufte & Wickhem, LLP

(57) ABSTRACT

A hybrid slotted time division multiple access (TDMA) and carrier sense multiple access (CSMA) based networks that optimize radio frequency (RF) based network resources, RF infrastructure, and improve network performance in a building which may include time critical sensors, such as smoke sensors, and non-critical sensors. The present system may classify critical sensors as guaranteed sensors which get TDMA slots assigned by a network manager. The non-critical sensors may operate in non-guaranteed CSMA slots but within a predefined latency interval. The present system may provide for both types of sensors to co-exist in tandem within the same wireless network.

16 Claims, 10 Drawing Sheets

NETWORK SUPPORTING TDMA AND CSMA BASED DEVICES

BACKGROUND

A present disclosure may relate to communication devices and particularly to wireless devices.

SUMMARY

The present disclosure may reveal how a hybrid slotted time division multiple access (TDMA) and carrier sense multiple access (CSMA) based networks may optimize radio frequency (RF) based network resources, RF infrastructure, and may improve network performance in a building which may include time critical sensors, such as smoke sensors, and non-critical sensors. The present system may classify critical sensors as guaranteed sensors which get TDMA slots assigned by a network manager. The non-critical sensors may operate in non-guaranteed CSMA slots but within a predefined latency interval. The present system may provide for both types of sensors to co-exist in tandem within the same wireless network.

DESCRIPTION

Figure 1:
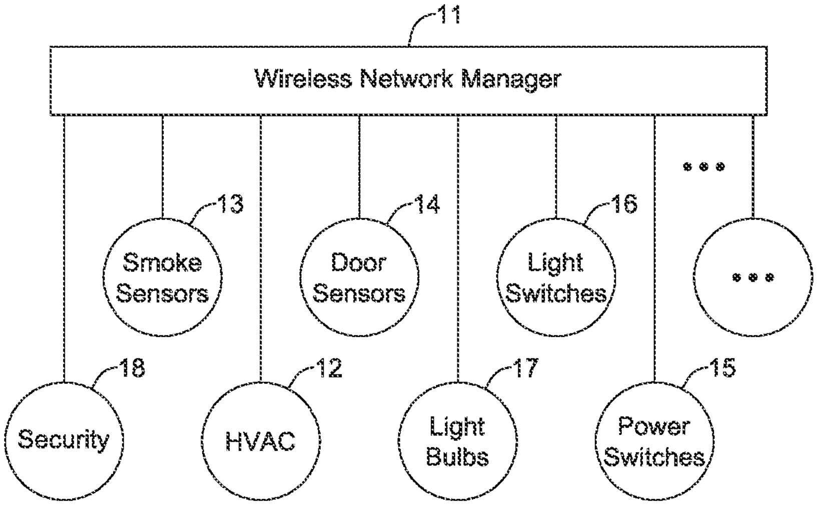
FIG. 1 is a diagram of a building management system having a wireless network manager layout.

The building automation may have multiple applications including fire, security, hospitality, lighting and building management system (BMS). When considering wireless sensors for these applications, each wireless system service of the present application may have different apparent requirements. For example, a wireless system for fire should have a faster and more reliable response with a guaranteed latency of two to three seconds. A wireless system used for security should have a ten-second alarm latency but not much data transfer is necessarily needed although it should have a guaranteed alarm delivery within the defined time-period. Wireless sensors in a BMS may need to transfer data periodically to a controller to maintain guest comfort. A lighting system may need 100 milliseconds being faster latency from detecting a person entering into a room and switching on lights. A single commercial wireless system may not necessarily meet these apparent requirements. Maintaining multiple wireless networks for each of the applications within the buildings may cost more for customers to deploy an infrastructure of wireless network as well as maintaining the networks. There appears to be a need to build a customized wireless system to handle many of the use-cases with a single wireless network/infrastructure in the building. The present system and approach may result in one such wireless network covering different applications deployed in buildings with a single wireless network.

The present system may cover a slotted time division multiple access (TDMA) and carrier sense multiple access (CSMA) in a hybrid model and allocate the TDMA and CSMA communication bandwidth based on the wireless sensors scale and type of the application. The present system may enable guaranteed latency and reliable communication based on a requested sensor duty-cycle (slotted TDMA) and periodic slow message transfer (CSMA).

Even though one may cover CSMA and TDMA, concurrently, none of them may necessarily provide guaranteed and reliable communication with the frequency hopping mechanisms as may be revealed in related art. The system may also cover a priority of the packets in the network based on an application noted herein. These may be critical points for a common sensor wireless infrastructure in buildings.

The present system and approach may build around a common wireless infrastructure for wireless sensors across different applications in the buildings. The technical benefits may include that of a hybrid TDMA and CSMA based wireless network which can be fixed or be dynamically based on a number of wireless sensors per application. The wireless network may allocate a bandwidth for each sensor in a TDMA based on an application, and allocate a CSMA communication for slow low data rate sensors having a less latency requirement.

The use cases of a large building system may have a lot of RF nodes and some sensors such as smoke sensors, security intrusion detection sensors that have a critical delivery time to meet an apparent regulatory requirement where the present system such as this becomes vital.

The system may have a software component. A stack level may have a gateway/control of management, administration, operations and data consolidation applications, and/or a translation layer between local environment and cloud enabling communication. A software type may be embedded. The software may run a device/unit (firmware) loT. An loT stack level may be a sensor such as a hardware device with some embedded software for measuring/detecting and transmitting data (e.g., temperature, pressure, motion, and more). The sensors may generate data and send the data to a gateway, and the gateway in turn may send the data to a controller/cloud.

FIG. 1 is a diagram of a building management system having a wireless network manager layout 11 with an HVAC 12, smoke sensors 13, door sensors 14, power switches 15, light switches 16, light bulbs 17, security 18, and so on.

Figure 2:
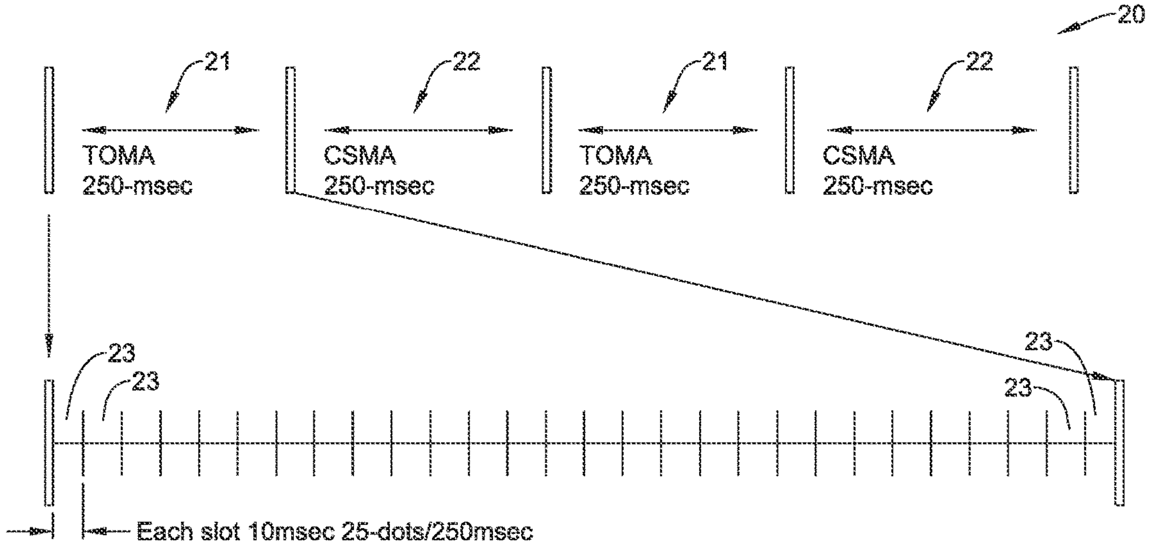
FIG. 2 is a diagram of a hybrid TDMA and CSMA network.

In FIG. 2, a hybrid TDMA and CSMA network may be noted. A wireless network 20 may be split into a hybrid mode of TDMA and CSMA functionality in terms of time duration. The network may operate a X-msec TDMA network and a Y-msec CSMA network in terms of a time domain. For example, the communication time in the wireless network 20 may be split to a 250 msec time 21 dedicated for TDMA and 250 msec time 22 for a CSMA based network (a 500-msec time frame). Not limited to 250-msec, a network could be split into a 100-msec TDMA and a 100-msec CSMA network as well depending on the application latency requirement. A 250-msec example case is shown where each TDMA duration 21 has 25 10-msec slots 23, followed by 250-msec CSMA operation 22 and this sequence may repeat.

Figure 3:
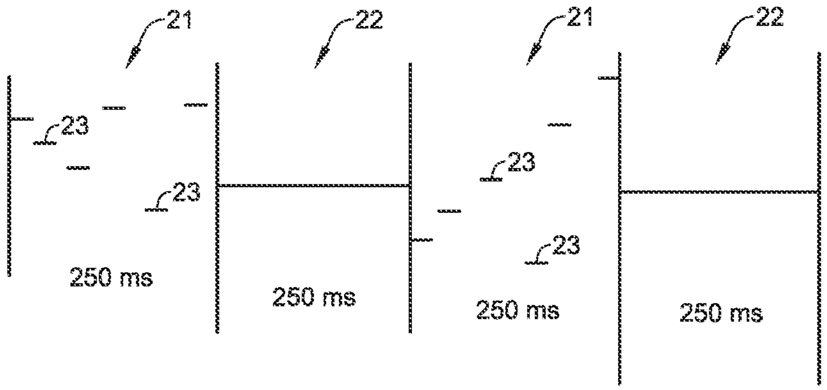
FIG. 3 is a diagram of numerous channels allocated for TDMA and a channel is allocated for CSMA communication.

During a TDMA 21 execution, sensors may use frequency hopping channels during each time slot 23 within the TDMA 21, and sensors operating in CSMA 22 may use a single frequency channel. For instance, one may consider a wireless network using 51 RF channels in 915 MHz frequency band (902-928 Mhz), 50 channels may be allocated for TDMA 21 and 1 channel is allocated for CSMA 22 communication as shown in a diagram of FIG. 3. Assuming that the TDMA 21 uses 10-msec time slots and a 250-msec duration, the 50 channels in TDMA 21 may be allocated, for example, each in every 250-msec, 50 channels get used up in two TDMA 250-msec frame duration within a second and the channels repeat every second. There may be channel hopping between TDMA 21 and CSMA 22. In each TDMA 21 slot 23, one may do frequency hopping.

Guaranteed devices may get a slot within 250-msec slots. Line powered devices may remain active virtually all the time. When there is no payload to transmit in a TDMA transmit slot, the 10-msec TDMA slot duration is free, the devices may switch to CSMA operation and stay in a receive mode actively which enables CSMA 22 operation within TDMA 21 slots and the device may switch to the respective CSMA channel to complete the packet reception from CSMA device if they transmit during that slot period. All TDMA 21 slots in 250-msec time frame are not allocated if there are not many TDMA sensors present in the network. The Router intelligently switches to CSMA 22 operation in TDMA 21 if any TDMA slots are not allocated to any TDMA sensors. If there is a receive TDMA slot allocated and no packet is received in TDMA receive slot, the device can as well switch to CSMA operation with in the reminder of the TDMA receive slot. As TDMA 21 uses multiple RF channels 23, there may be enough RF channels for assignment in a time vs frequency domain within a given geographical area. An example for a guaranteed device is a smoke sensor.

A non-guaranteed slow device may get into CSMA 22. Battery powered devices, which are more of sensors such as passive infrared (PIR) sensors, which need low latency communication but very rarely transmit data in the network (only when a person is detected or a door is opened, a switch button is pressed in such cases), they mostly rely on CSMA 22 based communication. An approach of reduced clear channel assessment (CCA) detection time in non-guaranteed slow devices when compared to guaranteed devices may increase the chances for the slow devices whenever they want to do the communication with their peers in the network. An example for a non-guaranteed device may be a door/light switch sensor which will have limited usage.

Devices may do CCA for minimum required time and try to be on air as soon as channel is detected free so as not to allow other devices to be on same channel. The start time to do CCA may be derived randomly and the seed for random number may be derived from the media access control (MAC) address of the devices, giving each device mostly different random numbers.

Figure 4:
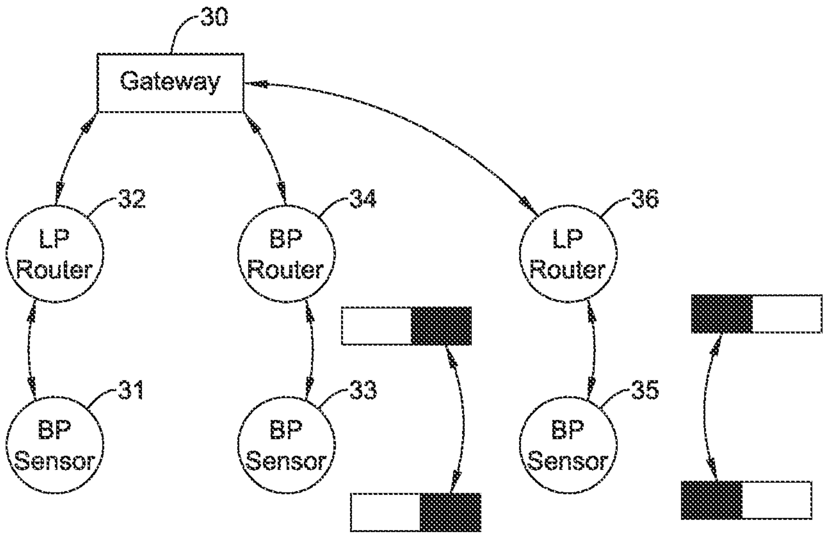
FIG. 4 is a topology diagram that shows a sensor connected to and acting as a router with line power that may do both TDMA+CSMA where different application sensors may communicate with a router.

A topology may be noted. FIG. 4 is a diagram that shows a sensor 31 connected to and acting as a router 32 with line power (LP) may do both TDMA+CSMA where different application sensors may communicate with a router. Router 32 may be generally on. Router 32 may be connected to a gateway 30. Router 32 may be a dedicated router or another sensor such as a wall module or a thermostat acting as a router which is mains (line) powered. Whereas battery powered (BP) sensors acting as routers, may do one of the techniques of only CSMA or TDMA. BP routers 31 are not necessarily limited to do only one technique because if they have enough battery power and have a secondary source such as an energy harvesting technique, they may decide to do both CSMA+TDMA techniques like line powered routers 32. A gateway 30 may allocate which one of these two techniques the sensor has to do based on the application needs.

When assigned only to a CSMA mode, the sensors 35 should talk to routers 36 only in a CSMA mode of operation with no time synchronization. An LP router 36 can do CSMA and TDMA. When sensors 33 are configured to do TDMA mode of operation, they may do TDMA in the defined TDMA slots only within the TDMA sub frame with maintained time synchronization. Sensor 33 may be connected to BP router 34 which can do only TDMA. BP router 34 may be connected to gateway 30. This may provide guaranteed latency for guaranteed nodes and guaranteed transmission to CSMA wakeup devices within a defined sub-frame time.

Figure 5:
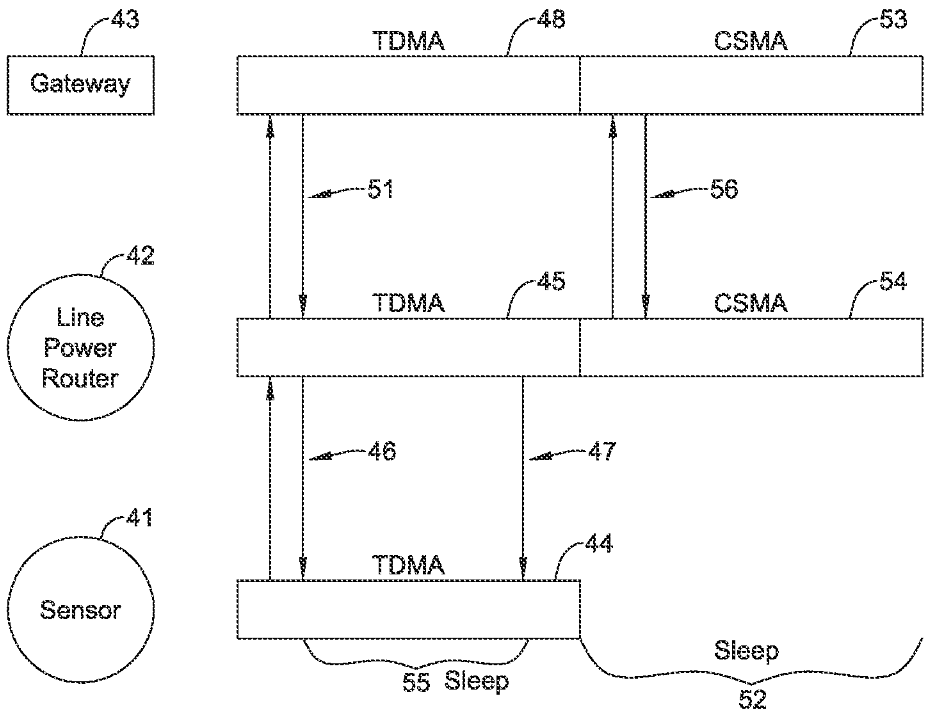
FIG. 5 is a diagram that illustrates how a TDMA sensor communicates.

One may note how a TDMA sensor 41 of FIG. 5 communicates. A TDMA sensor 41 may talk to a line power router 42 or a gateway 43 in TDMA slots 44 and 45, as indicated by connection 46. Connection 47 may synchronize the time with network in one of the TDMA slots where advertisements/beacons are received. Gateway 43 may allocate a TDMA sub-frame size (number of slots and duration) and the main frame duration (TDMA+CSMA frame duration) along with communication slots in the TDMA subframe with a slot period to send and receive the messages to the network. Gateway 43 also may provide a TDMA time sync slot to receive sync messages from the routers in the network to get sensor 41 to tightly sync with the network time to maintain the TDMA communication.

Sensor 41 may sleep 52 during the entire CSMA 53 communication time and also during TDMA sleep 55 when there are no communication slots or sync slot for one to talk to its neighbors. There may be a communication 56 between CSMA 53 and CSMA 54. Gateway 43 may allocate as many slots to as many sensors in a TDMA network based on their period duration of communication. For example, a sensor may get a slot number 10 with a duration of 60-sec; that means a device uses slot number 10 in TDMA slot only once every 60-seconds.

Figure 6:
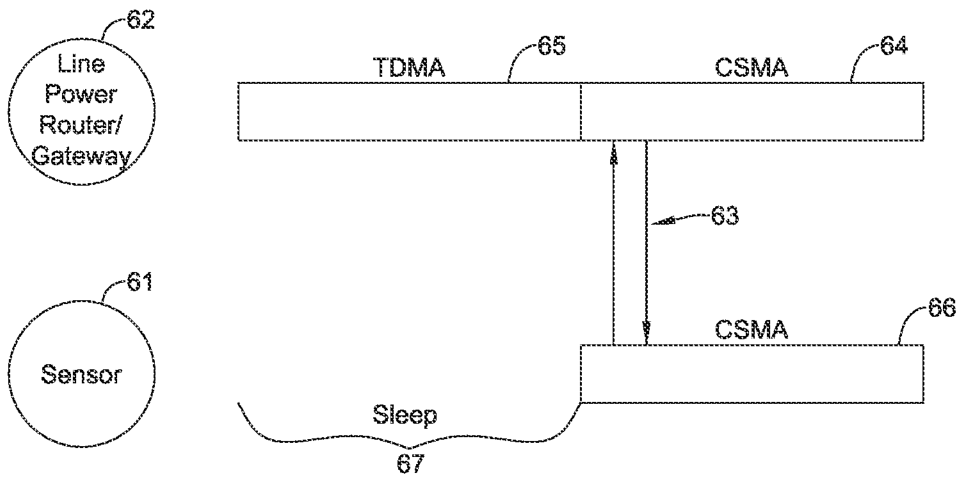
FIG. 6 is a diagram of how a CSMA sensor communicates.

One may note how a CSMA sensor 61 of FIG. 6 communicates. The CSMA sensor(s) 61 may talk to a router 62 or a gateway 62 in CSMA 64 communication 63 only. Sensors 61 may be long sleeping devices; they can sleep 67 for hours all together. They will not necessarily send any data unless there is a communication 63 to be sent to a gateway 62, or an alert is generated to be sent. So, that means that the sensors 61 may have no idea whether the routers are operating in either TDMA 65 or CSMA 64 slot when they wake-up and try to send a notification to a gateway. This is where the CSMA 66 retry algorithm may help.

In a first scenario, sensors 61 may wakeup and send a notification to a neighbor, considering that the neighbor may be exactly in a CSMA 64 or CSMA 66 slot, then a first try itself should succeed.

In a second scenario, sensors 61 may wakeup and send the notification to their neighbor, considering the neighbor is in a CSMA 64 slot, then a first try itself should or will succeed.

Figure 7:
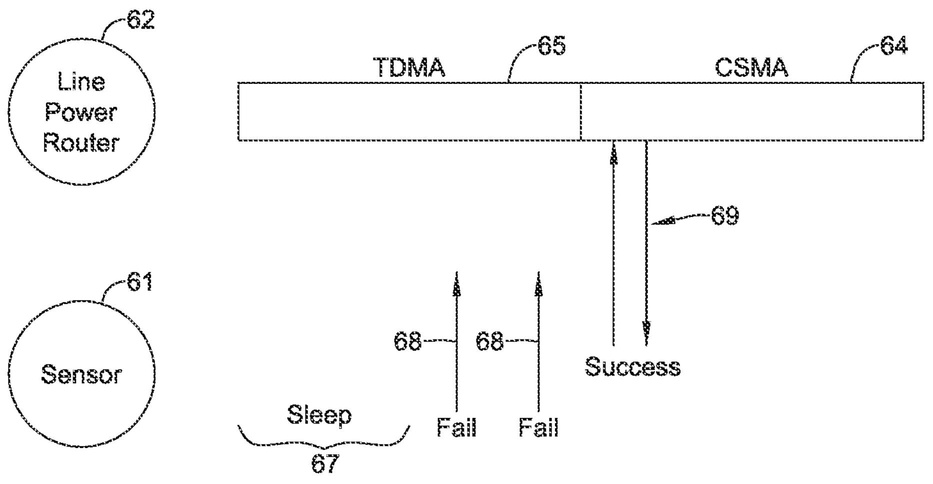
FIG. 7 is a diagram showing that a sensor should not necessarily attempt to do more than two tries in TDMA slots.
Figure 8:
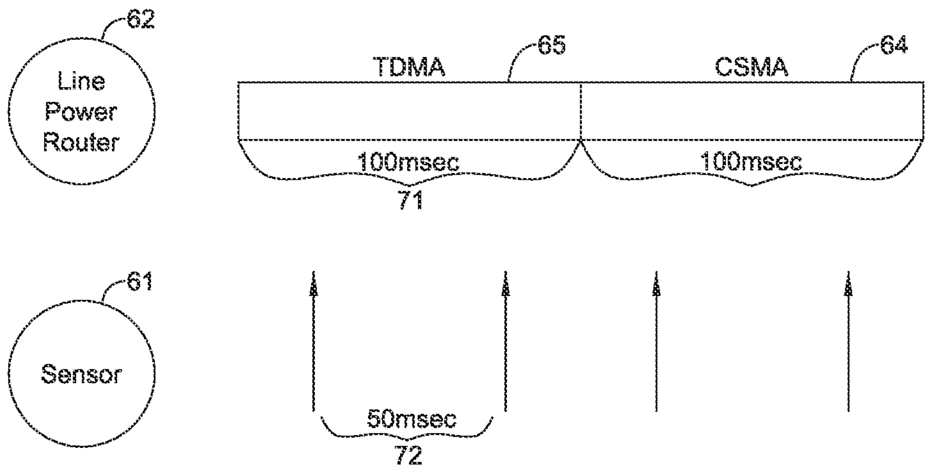
FIG. 8 is a diagram that shows that a number of CSMA retries may be designed in such a way that the duration of CSMA retries are picked based on the frame size.

One may note FIG. 8 in that a number of CSMA 64 retries 73 may be designed in such a way that the duration of CSMA 64 retries are picked based on the frame size, and sensor 61 should not necessarily attempt to do more than 2 tries in the TDMA 65 slots and first 2 retries 68 in FIG. 7 fail in the TDMA 65 duration and next two retries fall in the CSMA 64 duration and succeeds. In an example, assuming TDMA 65 sub frame size is 100 msec and CSMA 64 sub frame 71 size is 100-msec, the CSMA 64 retries may be spaced in a gap 72 of 50-msec with some randomization so that the sensor will try at least 2 retries in each sub-frame duration making sure the notification gets success. The TDMA 65 communication will not necessarily affect the CSMA 64 transmissions falling in the TDMA 65 period because the CSMA 64 may use a different frequency channel which is not in the TDMA 65 channel list of frequencies. There may be communications 69 between gateway or sensors and CSMA 64 for success.

In guaranteed TDMA 65 time slots, if they are not used (i.e., not allocated for any transmitter), routers 62 can do a CSMA 64 during that period which enables more success earlier for CSMA 64 devices. In FIG. 8, one may consider a transmit slot in a guaranteed time slot. If there is no payload to transmit, this slot can as well be used as a CSMA 64 receive slot. Thus, if more unused TDMA 65 slots are present in TDMA 65, doing CSMA 64 during run time in these slots, the performance of non-guaranteed devices (less frequently and non-critical communicating devices) may improve significantly.

For example, a 10-msec slot may be allocated to sensor X in router 62 for transmitting a packet to the sensor X. If there is no packet to transmit to X in this time, so router 62 may decide to do a CSMA 64 communication during this time which can provide a better chance of receiving a packet from a CSMA 64 sensor 61 during this time and help battery powered sensors 61 to avoid retries.

Figure 9:
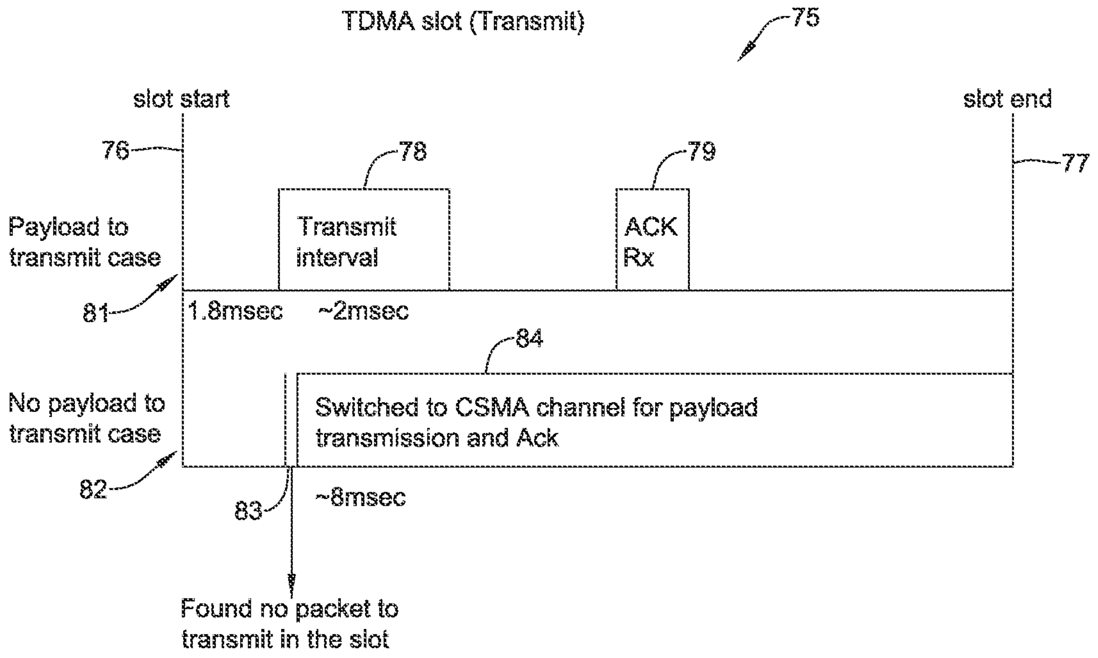
FIG. 9 and FIG. 10 are illustrative diagrams for payload transmit and receive cases.
Figure 10:
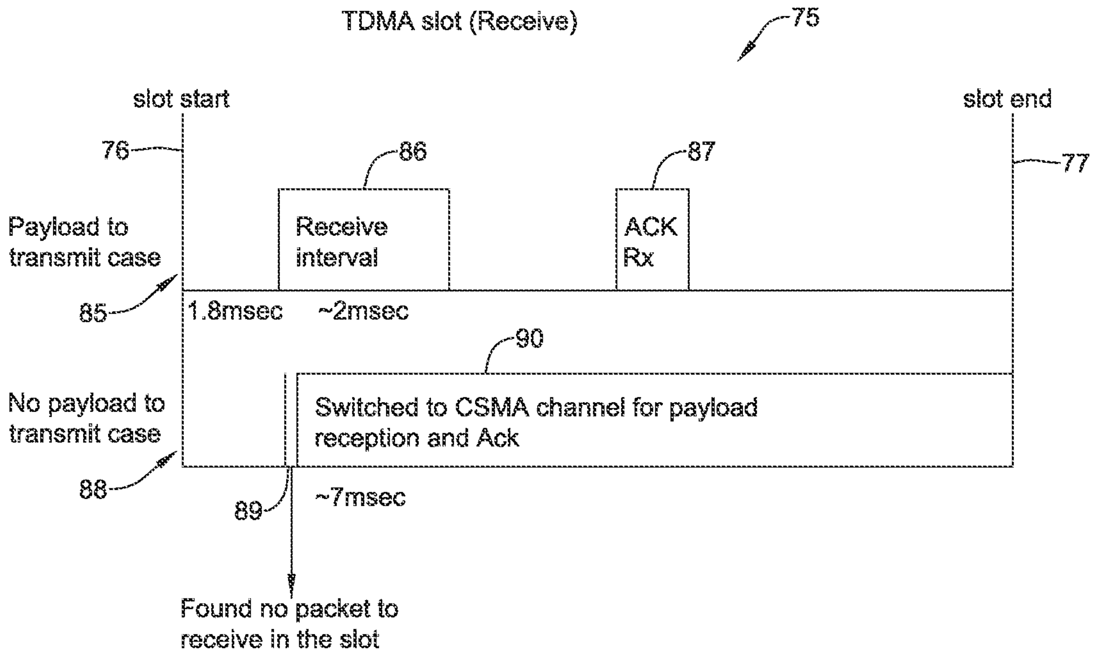

FIG. 9 and FIG. 10 are illustrative diagrams for payload transmit and receive cases, respectively. In FIG. 9, there may be a slot 75 start 76 and a slot end 77. For a payload to transmit case 81, there may be a transmit interval 78 and an ACK Rx (receipt acknowledgement) 79. For a no payload to transmit case 82, there may be a found no packet to transmit in a slot 83, and a signal 84 (indicating a switch to CSMA 64 channel for payload reception and Ack).

In FIG. 10, for a payload receive case 85, a receive interval 86 and an ACK Tx (transmit acknowledgement) 87. For a no payload to receive case 88, there may be a found a no packet to receive in a slot 89, and a signal 90 (indicating a switch to CSMA 64 channel for payload reception and Ack).

In FIG. 9, if a line powered router 62 of FIG. 8 has a transmit slot 75 in TDMA 65, router 62 may indicate within what time a packet has to start transmitting in that slot. If no packet is present in that slot for transmission; then at a remainder of the slot, one can switch to a CSMA 64 communication 84.

In FIG. 10, if there is a receive slot 75, router 62 of FIG. 8 may indicate a definitive time when it is receiving a payload. If there is no data received, then router 62 can switch to CSMA 64 mode 90 for a remainder of the timeslot.

Long sleeping devices may connect to a network without a wake for hours and still can send data/notification with a flexible CSMA mechanism and retries. The system may provide guaranteed latency for guaranteed nodes and guaranteed transmission to CSMA wakeup devices within a defined sub-frame time.

A number of CSMA retries may be designed in a way that, the duration of CSMA retries are picked based on the frame size and the sensor will not necessarily try more than two tries in the TDMA slots and the next two retries may fall in the CSMA duration. A TDMA communication will not necessarily affect the CSMA transmissions falling in the TDMA period because the CSMA may use a different frequency channel which is not in the TDMA channel list of frequencies and vice versa.

More features may be noted. In guaranteed TDMA time slots, if the slots are not necessarily used (e.g., not allocated for any transmitter), routers may do the CSMA during that period which enables more success for CSMA devices. If a line powered router has a transmit slot in the TDMA, and if there is no packet to transmit in that TDMA slot, a remainder of the slot, the router can switch to CSMA communication.

If a line powered router has a receive slot in the TDMA, the router knows, if no packet comes within that receive slot's receive start time, a remainder of the slot, the router can switch to a CSMA communication.

To recap, a sensor arrangement may incorporate a hybrid network of a slotted time division multiple access (TDMA) and a carrier sense multiple access (CSMA), one or more sensors, having a guaranteed latency, connected to the hybrid network, and one or more sensors, having a non-guaranteed latency, connected to the hybrid network. Some of the one or more sensors may be connected to one or more alarms, indicators, or user interfaces. The guaranteed latency may indicate that the sensor provides a response within a predetermined amount of time to a corresponding alarm, indicator, or user interface. The one or more sensors may be wireless devices.

The hybrid TDMA and CSMA network may have a frame size. The TDMA has a first sub-frame size and the CSMA has a second sub-frame size. The frame size and the sub-frame sizes may be fixed during an installation or modified during run time of the hybrid network.

The first sub frame size and second sub frame size may be configurable for latency needs of a corresponding sensor.

The network may allocate a bandwidth for each sensor in a TDMA based on an application, and allocate a CSMA communication for slower low data rate sensors having a smaller latency requirement than that for each sensor in the TDMA.

A sensor apparatus may incorporate a time division multiple access (TDMA) network and a time division multiple access (CSMA) network combined to form a hybrid network, and one or more guaranteed or non-guaranteed sensors situated at one or more buildings. A guaranteed sensor may provide an alarm delivery within a defined time-period between a detected signal at the guaranteed sensor and at the alarm delivery. Guaranteed sensors may be connected with the TDMA network. Non-guaranteed sensors may be connected with the CSMA network.

When sensors are assigned only to a CSMA mode of operation, the sensors should talk to routers within the CSMA mode of operation without time synchronization. When sensors are configured to do a TDMA mode of operation, they may do the TDMA mode of operation in defined TDMA slots is within the TDMA sub frame with maintained time synchronization.

One may do a CSMA mode of operation during TDMA slots when there are no TDMA allocated slots to any neighbor. One may do the CSMA mode of operation in a TDMA transmit slot, where there is no packet to transmit. One may do the CSMA mode of operation in a TDMA receive slot, when there is no packet to receive.

Guaranteed sensors and non-guaranteed sensors may co-exist in tandem within one wireless network, or the sensors may generate data and send the data to a gateway, and the gateway in turn may send the data to a controller/cloud.

A sensor system may incorporate a network manager module, a plurality of sensors connected to the network manager module, and a network formed into a hybrid mode of time division multiple access (TDMA) and carrier sense multiple access (CSMA) functionality in terms of time duration. The plurality of sensors may include a set of guaranteed sensors and a set of non-guaranteed sensors.

The sensors may be wireless devices.

A distinction of time of the sensors may be regarded as a latency.

A latency of a response to a detection by a sensor may be measured as a time period between a detection by the sensor and an available response relative to an output from the sensor.

The time period may be less than X msec for guaranteed sensors. The time period may be equal to or greater than X msec for non-guaranteed sensors. X may be a pre-determined whole positive number.

Each sensor of the plurality of sensors may be a time critical sensor or a time non-critical sensor.

The time critical sensors may be assigned TDMA slots by the network manager module. Other sensors may be non-critical in that they operate in non-guaranteed CSMA slots within a pre-defined latency interval.

The network operates a communication time of an A msec TDMA network and a B msec CSMA network. A and B may be pre-determined whole positive numbers.

The communication time may be split into an A msec time dedicated for the TDMA network and a B msec time dedicated for the CSMA network. Each A msec TDMA time may be divided into C time slots. Each A msec TDMA time may be followed or preceded by the B msec CSMA time to form a sequence that can be repeated. C may be a pre-determined whole positive number.

During a TDMA execution, sensors may use frequency hopping channels in one or more time slots within the TDMA.

Sensors operating in the CSMA may use a single frequency channel.

There may be channel hopping between TDMA and CSMA. Frequency hopping may occur in one or more slots of the TDMA.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A sensor arrangement comprising:

a hybrid network of a slotted time division multiple access (TDMA) and a carrier sense multiple access (CSMA);

one or more sensors, having a guaranteed latency, connected to the hybrid network; and one or more sensors, having a non-guaranteed latency, connected to the hybrid network; and wherein:

some of the one or more sensors are connected to one or more alarms, indicators, or user interfaces;

the guaranteed latency indicates that the sensor provides a response within a predetermined amount of time to a corresponding alarm, indicator, or user interface;

the one or more sensors are wireless devices;

the hybrid TDMA and CSMA network has a frame size;

the TDMA has a first sub-frame size;

the CSMA has a second sub-frame size; and the frame size and the sub-frame sizes are fixed during an installation or modified during run time of the hybrid network, wherein the first sub frame size and second sub frame size are configurable for latency needs of a corresponding sensor.

2. The arrangement of claim 1, wherein the network can allocate a bandwidth for each sensor in a TDMA based on an application, and allocate a CSMA communication for slower low data rate sensors having a smaller latency requirement than that for each sensor in the TDMA.

3. The arrangement of claim 1, wherein the hybrid network comprises a slotted time division multiple access (TDMA) period and a carrier sense multiple access (CSMA) period; wherein the one or more guaranteed latency sensors are assigned defined TDMA slots in the slotted TDMA period to ensure the response within the predetermined amount of time; and wherein the one or more non-guaranteed latency sensors access the hybrid network during the CSMA period using contention-based channel access.

4. A sensor apparatus comprising:

a time division multiple access (TDMA) network and a time division multiple access (CSMA) network combined to form a hybrid network; and one or more guaranteed or non-guaranteed sensors situated at one or more buildings; and wherein:

a guaranteed sensor provides an alarm delivery within a defined time-period between a detected signal at the guaranteed sensor and at the alarm delivery;

guaranteed sensors are connected with the TDMA network; and non-guaranteed sensors are connected with the CSMA network;

wherein guaranteed sensors and non-guaranteed sensors co-exist in tandem within one wireless network.

5. The apparatus of claim 4, wherein:

when sensors are assigned only to a CSMA mode of operation, the sensors should talk to routers within the CSMA mode of operation without time synchronization; and when sensors are configured to do a TDMA mode of operation, they can do the TDMA mode of operation in defined TDMA slots within the TDMA sub frame with maintained time synchronization.

6. The apparatus of claim 4, wherein:

do a CSMA mode of operation during TDMA slots when there are no TDMA allocated slots to any neighbor;

do the CSMA mode of operation in a TDMA transmit slot, where there is no packet to transmit; and do the CSMA mode of operation in a TDMA receive slot, when there is no packet to receive.

7. A sensor system comprising:

a network manager module;

a plurality of sensors connected to the network manager module; and a network formed into a hybrid mode of time division multiple access (TDMA) and carrier sense multiple access (CSMA) functionality in terms of time duration; and wherein:

the plurality of sensors comprises a set of guaranteed sensors and a set of non-guaranteed sensors;

the network operates a communication time of an A msec TDMA network and a B msec CSMA network;

each of A and B are pre-determined whole positive numbers;

the communication time is split into an A msec time dedicated for the TDMA network and a B msec time dedicated for the CSMA network;

each A msec TDMA time is divided into C time slots;

each A msec TDMA time is followed or preceded by the B msec CSMA time to form a sequence that can be repeated; and C is a pre-determined whole positive number.

8. The system of claim 7, wherein the sensors are wireless devices.

9. The system of claim 7, wherein a distinction of time of the sensors is regarded as a latency.

10. The system of claim 9, wherein a latency of a response to a detection by a sensor is measured as a time period between a detection by the sensor and an available response relative to an output from the sensor.

11. The system of claim 10, wherein:

the time period is less than X msec for guaranteed sensors;

the time period is equal to or greater than X msec for non-guaranteed sensors; and X is a pre-determined whole positive number.

12. The system of claim 8, wherein the plurality of sensors includes at least one of each of time critical sensors and time non-critical sensors.

13. The system of claim 12, wherein: the time critical sensors are assigned TDMA slots by the network manager module; and other sensors are non-critical in that they operate in non-guaranteed CSMA slots within a pre-defined latency interval.

14. The system of claim 7, wherein during a TDMA execution, sensors can use frequency hopping channels in one or more time slots within the TDMA.

15. The system of claim 14, wherein sensors operating in the CSMA can use a single frequency channel.

16. The system of claim 8, wherein:

there can be channel hopping between TDMA and CSMA; and frequency hopping can occur in one or more slots of the TDMA.

* * * * *